United States Patent [19]
Dowler et al.

[11] Patent Number: 6,029,431
[45] Date of Patent: Feb. 29, 2000

[54] VEHICLE

[76] Inventors: David Dowler, Ascott Hill Farm, Ascott under Wychwood Chipping, Norton Oxon, OX7 6AL; David John Thomson, 6 Alfriston Road, Coventry CV3 6FH; Lawrence G. Watts, 228 Baginton Road, Stivichall Coventry, CV36 6FU, all of United Kingdom

[21] Appl. No.: 08/849,063
[22] PCT Filed: Nov. 23, 1995
[86] PCT No.: PCT/GB95/02752
§ 371 Date: Jul. 23, 1997
§ 102(e) Date: Jul. 23, 1997
[87] PCT Pub. No.: WO96/15656
PCT Pub. Date: May 30, 1996

[30] Foreign Application Priority Data

Nov. 23, 1994 [GB] United Kingdom .................... 9423669

[51] Int. Cl.[7] .................................................. A01B 51/02
[52] U.S. Cl. ............................................. 56/14.3; 180/234
[58] Field of Search .................................... 56/14.3, 13.5, 56/15.6, 228, 473.5, DIG. 9; 460/116, 119; 180/234, 236, 6.48

[56] References Cited

U.S. PATENT DOCUMENTS

| | | | |
|---|---|---|---|
| 3,568,778 | 3/1971 | Swisher, Jr. et al. | 180/235 X |
| 3,692,134 | 9/1972 | Shepherd et al. | 180/234 X |
| 4,611,683 | 9/1986 | Hilmer | 180/234 X |

*Primary Examiner*—Robert E. Pezzuto
*Attorney, Agent, or Firm*—Barnes & Thornburg

[57] ABSTRACT

A vehicle comprises a structure 10 including an elongate section 11 connected to chassis sections 12,13 at its ends. Each chassis section 12,13 carries two steerable drive wheels 18,20. Two engines 16 are provided, one carried by each chassis section 12, 13 to drive the wheels 18,20 of that chassis section 12,13. The vehicle can be driven transverse to or longitudinally of the elongate section 11. The elongate section 11 is offset in relation to the chassis sections 12,13. Each wheel 18,20 is mounted by an arm 22, each arm 22, being connected to each respective wheel 18,20 within the height of the wheel and at each side of the vehicle. On each chassis section 12,13 one arm 22 is connected to one side of its respective wheel 18,20 and the other arm 22 is connected to the other side of its respective wheel 18, 20. Each arm 22 is connected to two pivot points within the wheel 18,20 on the upright diametrical axis of the wheel.

9 Claims, 15 Drawing Sheets

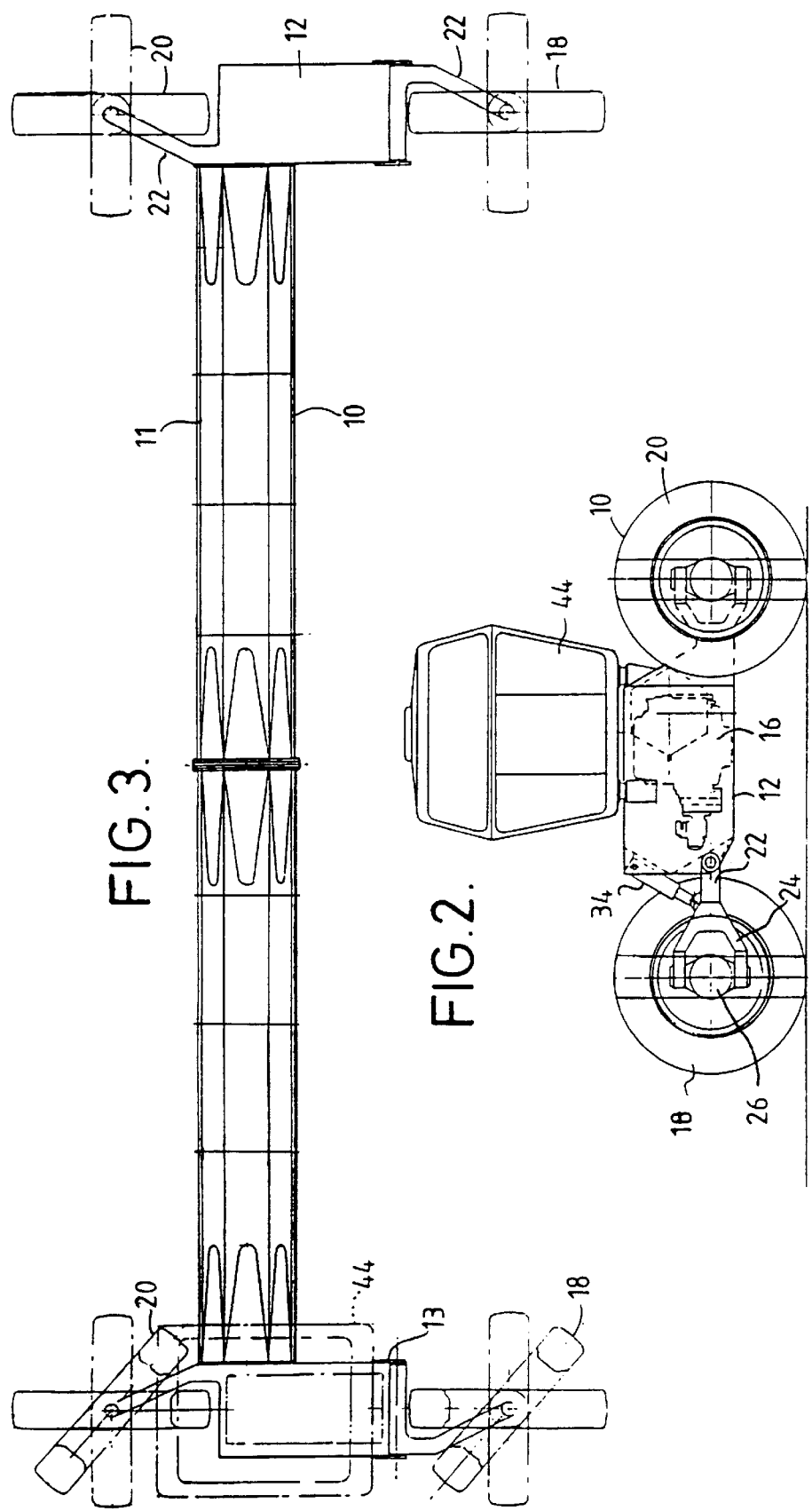

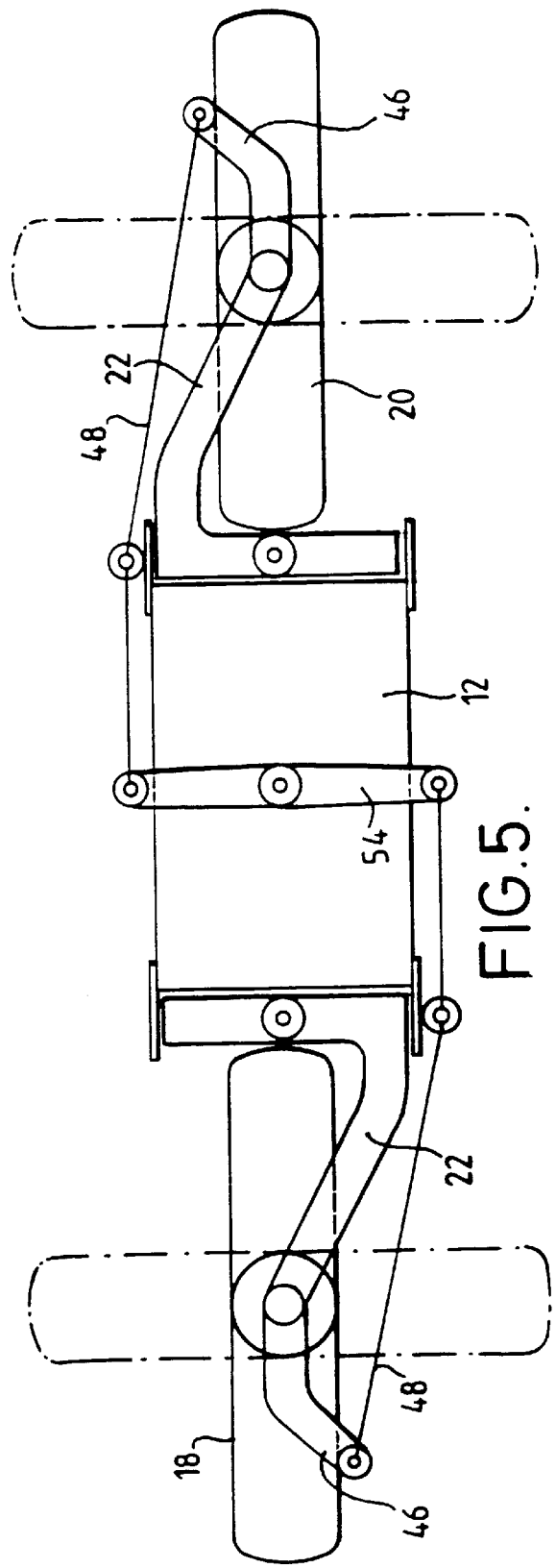
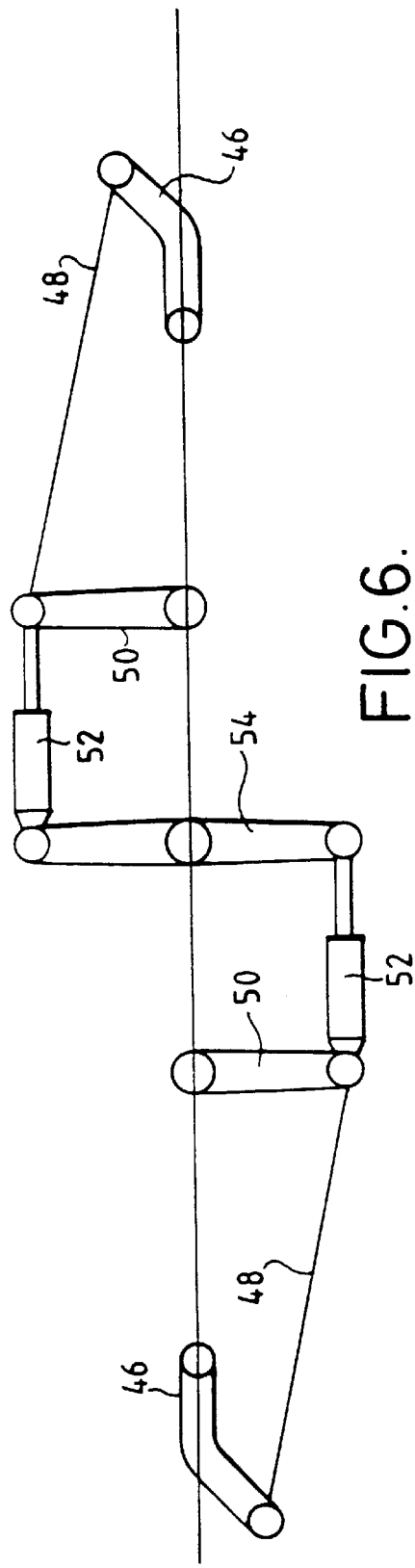

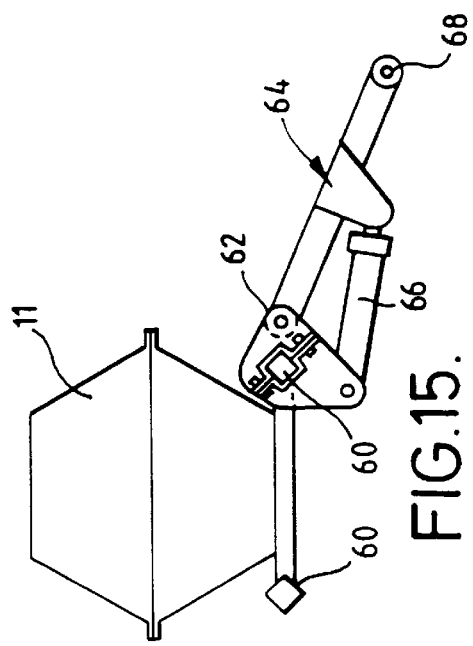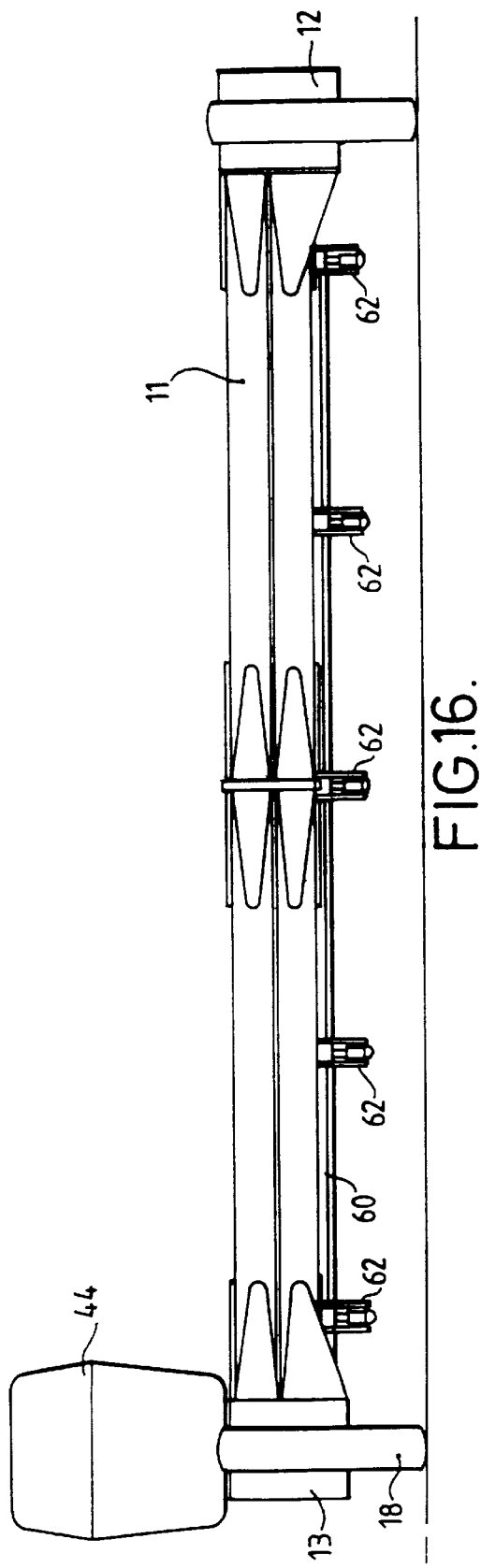

VEHICLE

CROSS-REFERENCES TO RELATED APPLICATIONS

This application is a U.S. national application of international application serial No. PCT/GB95/02752 filed Nov. 23, 1995, which claims priority to British Serial No. 9423669.2 filed Nov. 23, 1994.

A vehicle is known, for example, as described in WO90/07866 which comprises an elongate section having chassis sections at its ends. Each chassis section carries a drive wheel and a further wheel. The drive wheels can be driven to enable the vehicle to travel transverse to or longitudinally of the elongate section. A cab for a driver is provided at one end of the vehicle mounted on one of the chassis sections.

The vehicle described in WO90/07866 includes a single engine carried by one of the chassis sections at one end of the vehicle. The single engine powers a hydraulic motor mounted on each driving wheel through a hydraulic system.

According to one aspect of the invention there is provided a vehicle comprising a structure including an elongate section, at least one driving wheel carried by a further section of the structure adjacent each end of the elongate section and drive means for driving the driving wheels, the drive means comprising two engines, one engine being carried by each further section and driving the or each driving wheel of that further section.

Providing an engine on each further section of the vehicle which carries at least one driving wheel provides improved traction in comparison with the known vehicle as the weight distribution of the vehicle in relation to the wheels is improved.

Preferably, each engine drives the or each driving wheel of the further section by which it is carried by a hydraulic motor.

The use of a single engine and the consequent splitting of the hydraulic drive is complex requiring extensive use of hydraulic conduit along the length of the elongate section to the opposite chassis section to power that wheel. Two hydraulic pumps must be driven at constant speed, output from the pumps being controlled at a splitter box to enable the required amount of hydraulic fluid to be fed to the drive wheels at either end of the vehicle. The use of an engine at each end of the vehicle of the invention significantly simplifies that system, as each engine is close to the wheel which it must drive and thus power need not be transmitted from one end of the vehicle to the other. The length of hydraulic conduit needed in the vehicle of the invention is greatly reduced over the prior known vehicle and while splitter box arrangements are still required, this is a significant improvement.

Preferably, a hydraulic motor is provided for each driving wheel.

A plurality of driving wheels may be carried by each further section. The vehicle may also be arranged to be driven longitudinally of the elongate section.

Tractors and other such vehicles are used to pull an elongate frame mounting a plurality of implements across the field. The frame is frequently longer than the width of the tractor and so tends to be attached centrally of the frame.

According to a further aspect of the invention there is provided a vehicle comprising an elongate section and drive means for driving the vehicle in a direction transverse to the elongate section, the elongate section including a plurality of linkages, each linkage being arranged to be connected to the ends of adjacent frames carrying tools to be drawn over a surface by the vehicle.

As the vehicle linkages are connected to the ends of adjacent frames, the frames follow the ground contour in a much improved manner compared with connection to the frame mid-points and improved coverage of the around is achieved.

Preferably, the vehicle is also arranged to be driven longitudinally of the elongate section. At least one driving wheel to be driven by the driving means may be carried by a further section provided at each end of the elongate section.

Each linkage may be mounted in any suitable way but preferably is slidably mounted on a rail which extends along the elongate section. Preferably locking means is provided to lock each linkage onto the rail. The angle of each linkage to the elongate section is preferably adjustable. The vehicle preferably includes at least one height sensor to determine the height of the vehicle above a surface it is driving over and control means to control the angle of each linkage in response to the height sensed by the or each height sensor. In this way, it can be ensured that frames are drawn across the surface at an appropriate height for the tools carried by the frames to work effectively.

In the known vehicle of WO90/07866, the elongate section is connected centrally to each of the further sections.

According to another aspect of the invention there is provided a vehicle comprising a structure including an elongate section, at least one driving wheel carried by a further section of the structure adjacent each end of the elongate section, drive means for driving the vehicle in a direction transverse or longitudinally of the elongate section, the elongate section being transversely offset in relation to the further sections.

Preferably, the elongate section is offset by a distance such that equipment to be carried or pulled by the vehicle does not extend transversely past the transverse extent of the further sections. This improves the weight distribution of the vehicle and consequently its traction and power transmission. Preferably, each further section carries a plurality of transversely spaced wheels. In that case, the elongate section is preferably offset by a distance such that equipment to be carried or pulled by the vehicle lies within the notional plan rectangle defined by the pivot axes of the outermost wheels of the further sections. Preferably, the outermost wheels of the further sections are drive wheels.

The vehicle of WO90/07866 includes large drive wheels and smaller further wheels which act as castors. A hydraulic motor is mounted to the hub of each drive wheel and a mounting section extends up from the hub to a kingpin mounted directly above the wheel on the upright diametrical axis thereof to enable pivoting of the wheel. The kingpin may undergo high forces in use due to the lever effect of the long mounting section connecting the kingpin to the hub of the wheel. Nevertheless this arrangement does permit a wide angle of movement so that the vehicle can be driven longitudinally with a reasonable angle of movement for the wheels to enable steering of the vehicle to the left or the right as it is driven along a road, for example, while at the same time permitting the wheels to be turned through a sufficient angle to enable the vehicle to be driven transversely.

According to still another aspect of the invention there is provided a vehicle including two steerable wheels at each side thereof, each wheel being mounted by an arm, each arm being connected to each respective wheel within the height of the wheel and at each side of the vehicle, one arm being connected to one side of its respective wheel and the other arm being connected to the other side of its respective wheel.

This enables a wide range of movement of the wheel in a rugged structure.

The front arm at each side of the vehicle may be connected to the inside or the outside of its respective wheel, but preferably is connected to the outside of its respective wheel. This provides better turning clearance in use.

Each arm is preferably connected to its respective wheel at at least one pivot connection point within the wheel on the upright diametrical axis.

According to a further aspect of the invention there is provided a vehicle including at least one steerable wheel, an arm connecting the wheel to the body of the vehicle, the arm extending to at least one pivot connection point within the wheel on the upright diametrical axis of the wheel.

In this way, the pivot connection point will be closer to the axis of rotation of the wheel and stresses on the pivot point in use will be lower.

Preferably at least two such steerable wheels are provided.

Preferably, the arm extends to two said pivot connection points on either side of the centre of the wheel. This provides a balanced, strong engineering arrangement.

Preferably, each wheel can be pivoted through more than 90°. Preferably further each wheel can be pivoted through more than 110°, more preferably more than 125° and most preferably more than 135°.

The or each wheel may be arranged to be driven. In one embodiment, the or each wheel is arranged to be driven by a motor mounted on the axis of rotation of the wheel. The motor may be hydraulic motor and in that case, the supply tubes to the motor preferably extend along the arm towards the wheel and are turned back to be connected to the motor. The free loop in the tube which results from turning back of the tube to be connected to the motor permits a wide range of movement of the wheel in relation to the arm without the tubes forming too large a loop which might contact the wheel, and without the tubes limiting the angle of pivoting of the wheel.

Preferably, the vehicle comprises a structure including an elongate section, at least one steerable driving wheel carried by a further section of the structure adjacent each end of the elongate section and drive means for driving the vehicle in the direction transverse to or longitudinally of the elongate section.

Preferably, at least one of the further sections includes two steerable wheels. The two steerable wheels of the or each further section preferably receive their respective arms on opposite sides. Each arm may extend generally transversely of the vehicle. Suitably, the wheels of each further section may be aligned when the vehicle is arranged to drive transversely.

Preferably, each steerable wheel includes a limb extending outwardly on the same side of the wheel as the connecting arm, the limb being pivotally connected to an elongate member which is pivotally connected to one side of a centrally pivotable element, the elongate members of the two wheels being pivotally connected to opposed sides of the centrally pivotable element such that pivoting of the pivotable element about an upright axis causes pivoting of the wheels to steer them. Preferably, at least one of the elongate members is extendable and may be telescopically extendable. Preferably, control means is provided to control the extendable length of the or each extendable elongate member. In this way, not only can the wheels be pivoted in parallel alignment, but the wheels can be arranged at different angles to one another to enable movement of the vehicle in different ways. This arrangement provides a compact and simple means of achieving control of the angle of the wheels to one another.

The combine harvester is now the established machine for harvesting corn. The known combine harvester cuts the base of the standing crop and the cut crop then enters the combine harvester and passes through a threshing cylinder which separates the grain from the remainder of the crop. The stalks are eventually deposited on the field behind the machine and the grain is either temporarily stored in the combine harvester or conveyed to a container vehicle rubbing alongside the combine harvester. The grain is separated from lighter matter by blowing air through the grain so that lighter matter is lifted away from the grain and deposited back on the field. This means that if any weeds are picked up by the combine harvester, the main part of the weed will be re-deposited onto the field and any weed seeds will be blown up into the air to land over a wide area of the field or to be carried by the wind into neighbouring areas. It is well known that combine harvesters are a major problem in spreading weeds and lead to the extensive use of herbicides as a result.

According to another aspect of the invention there is provided a vehicle for harvesting corn comprising a structure including an elongate section, at least one driving wheel carried by a further section of the structure adjacent each end of the elongate section, drive means for driving the vehicle in a direction transverse to the structure, the elongate section mounting means for removing the heads from corn along its length, and means for carrying the heads into a hopper such that substantially all of the matter removed by the removing means is carried into the vehicle.

In this way, if any weed heads are cut, the seed will be carried into the vehicle. The cut heads and weed seeds can then be taken to an appropriate environment for separation of the grains of corn without distribution of the weed seeds onto agricultural land.

The vehicle is preferably also arranged to be driven in a direction longitudinally of the structure.

The vehicle may include sieve means for separating loose grains of corn into a further hopper.

As the vehicle has wheels at each end and not in the region of the removing means, the straw will be left upright to dry in the field and consequently will dry rapidly and also provide good quality straw as it will not have been driven over by machinery or, for example, passed through the threshing machinery of a combine harvester, which degrades the quality of the straw.

Preferably, at least the removing means and the hopper are removable from the vehicle and the vehicle is arranged to mount means for cutting standing straw along the length of the elongate section, means for carrying the straw to baling means and wrapping means for wrapping the cut matter such that substantially all of the matter cut by the cutting means is wrapped. Thus, any further weed seeds which are picked up also will not be spread onto the field which has been cut.

According to a further aspect of the invention there is provided a vehicle for cutting straw comprising a structure including an elongate section, at least one driving wheel carried by a further section of the structure adjacent each end of the elongate section, drive means for driving the vehicle in a direction transverse to the structure, the elongate section mounting means for cutting standing straw along its length, means for carrying the straw to baling means and wrapping means for wrapping the cut matter such that substantially all of the matter cut by the cutting means is wrapped.

The vehicle is preferably also arranged to be driven in a direction longitudinally of the structure.

Although the straw and grain are collected in two separate operations, as the vehicle can be very wide, due to its ability to be driven transversely and longitudinally, relatively few passes are needed to cover a field compared with the narrower combine harvester, for example, and the reduction in weed spreading and improved quality of straw are major benefits.

According to another aspect of the invention there is provided a method of turning a vehicle comprising aligning the front wheels straight ahead, angling the outer rear wheel outwardly from the other front wheel and providing the inner rear wheel perpendicular to the inner front wheel.

The enables the vehicle to turn about one end which may be particularly useful where the vehicle is very long and in particular is a vehicle according to any of the preceding aspects of the invention.

Embodiments of the invention will now be described by way of example and with reference to the accompanying drawings, in which:

FIG. 2 is an end elevation of the vehicle showing one engine in phantom;

FIG. 3 is a plan view of the vehicle showing the cab in phantom;

FIG. 5 is a partially schematic view in plan of the steering system of one chassis unit;

FIG. 6 is a diagrammatic view of the steering system of FIG. 5;

FIG. 15 is a side elevation in cross-section of the elongate section and one linkage;

FIG. 16 is a front view showing linkages on the elongate section;

Figure 1:
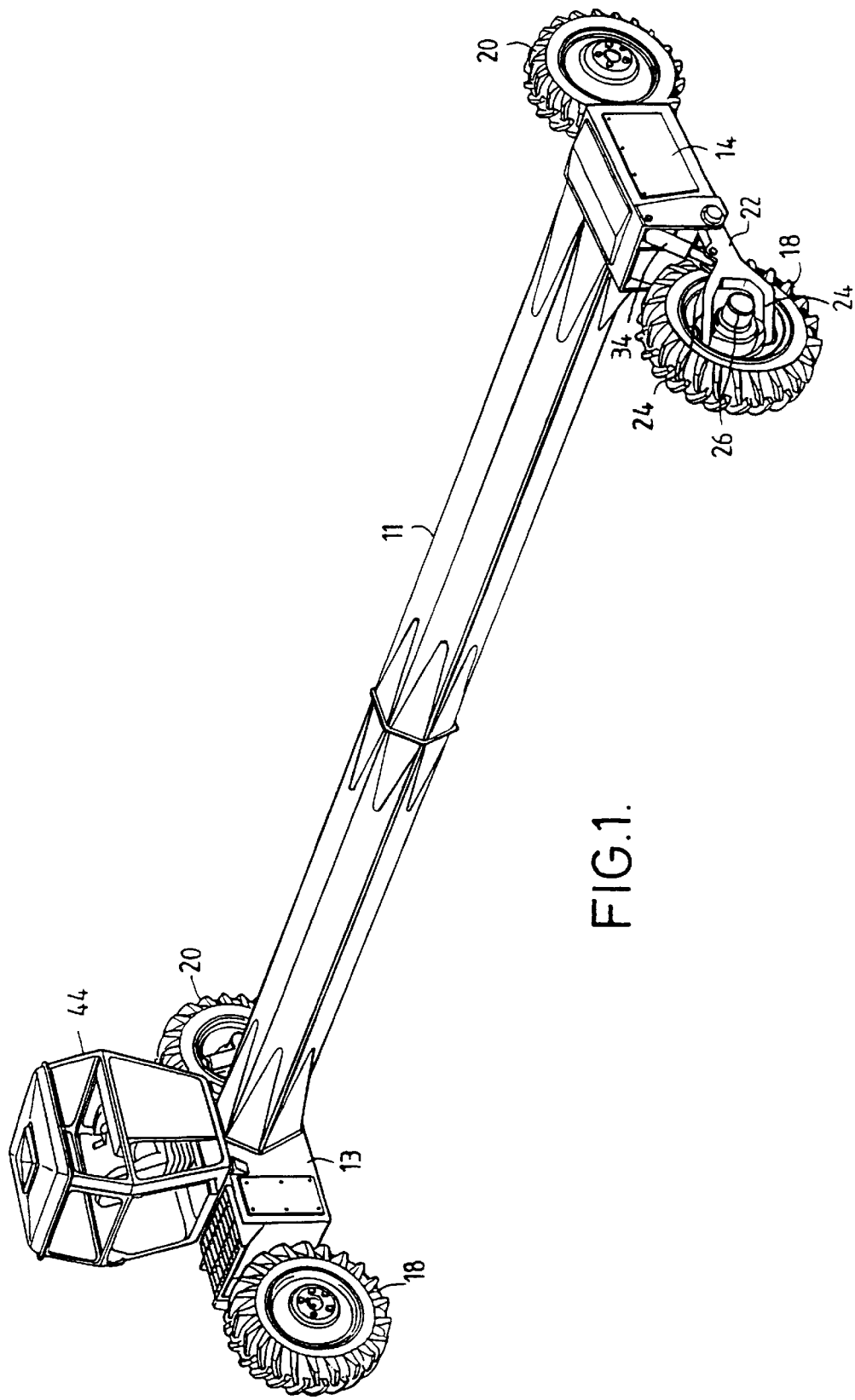
FIG. 1 is a perspective view of the vehicle of the embodiment.
Figure 4:
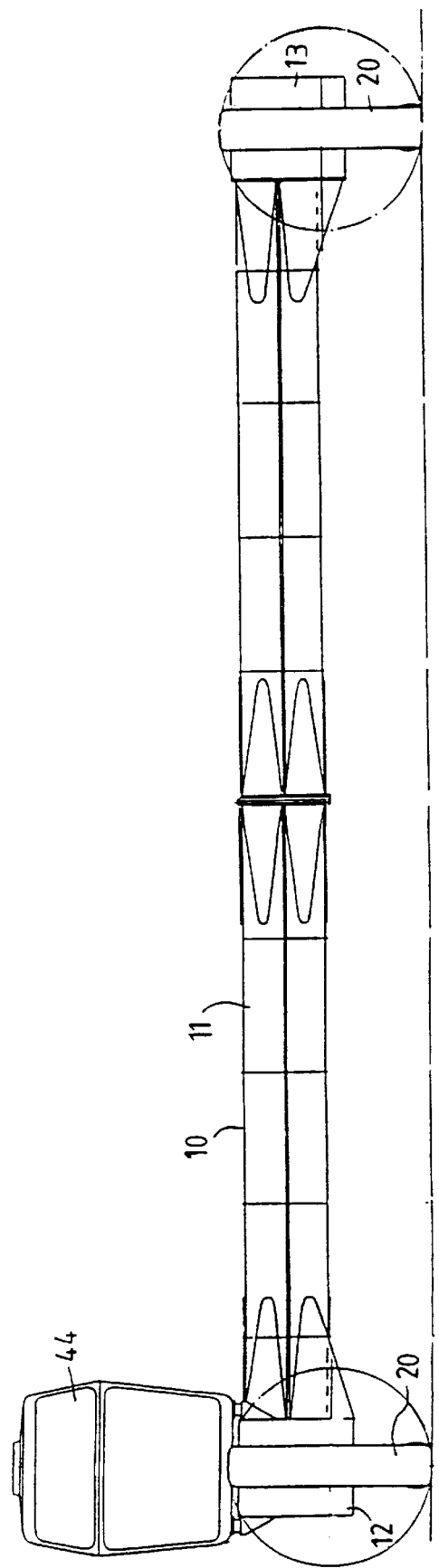
FIG. 4 is a front elevation of the vehicle.

The vehicle comprises an elongate structure 10 comprising a main frame section 11 (constituting the aforesaid "elongate section") connected to chassis sections 12,13 at its ends, the chassis sections constituting the aforesaid "further sections".

The elongate section 11 can be arranged to carry various types of tools (which term includes implements, sprayers, spreaders and the like).

The elongate section 11 comprises a hexagonal cross-section tubular frame formed from pressed metal sheet or plate. The elongate section 11 includes an upper half hexagon section 28 and lower half hexagon section 29 which are bolted together through edge flanges 28a, 29a. Hydraulic pipework runs inside the elongate section 11 from one end to the other.

The chassis sections 12,13 exhibit mirror symmetry and only one chassis section 12 will be described in detail. Chassis section 12 comprises a main rectangular casing 14 within which is provided an engine 16 which drives two wheels 18,20 provided fore and aft of the casing 14. Each wheel 18,20 is connected to the chassis section 12 in a similar way. The connection of the rear wheel 18 will be described. A connecting arm 22 extends rearwardly from the chassis section 12 perpendicularly to the longitudinal axis of the elongate section 11. Assuming the wheel 18 to be arranged with its rotational axis parallel to the longitudinal axis of the elongate section 11, once the arm 22 has overlapped and passed beyond the rim of the wheel 18, the arm 22 is divided into two branches 24 which extend inwardly into the wheel 18 at a shallow angle to be connected to the hub 26 of the wheel 18 at pivot points above and below the rotational axis of the wheel 18 and on an upright diametrical axis of the wheel 18. The arm 22 is thus in the form of a yoke. There is mounted on the hub 26 between the pivot points of the arms a hydraulic motor 32 to drive the wheel 18. Tubular hoses 33 from the engine 16 extend along the arm 22 along the upper branch 24 of the arm 22 being looped beyond the pivot point 30 of the arm 22 and back to be connected to the cylindrical hydraulic motor casing half way up the casing on its opposite side from the chassis section 12.

Figure 7:
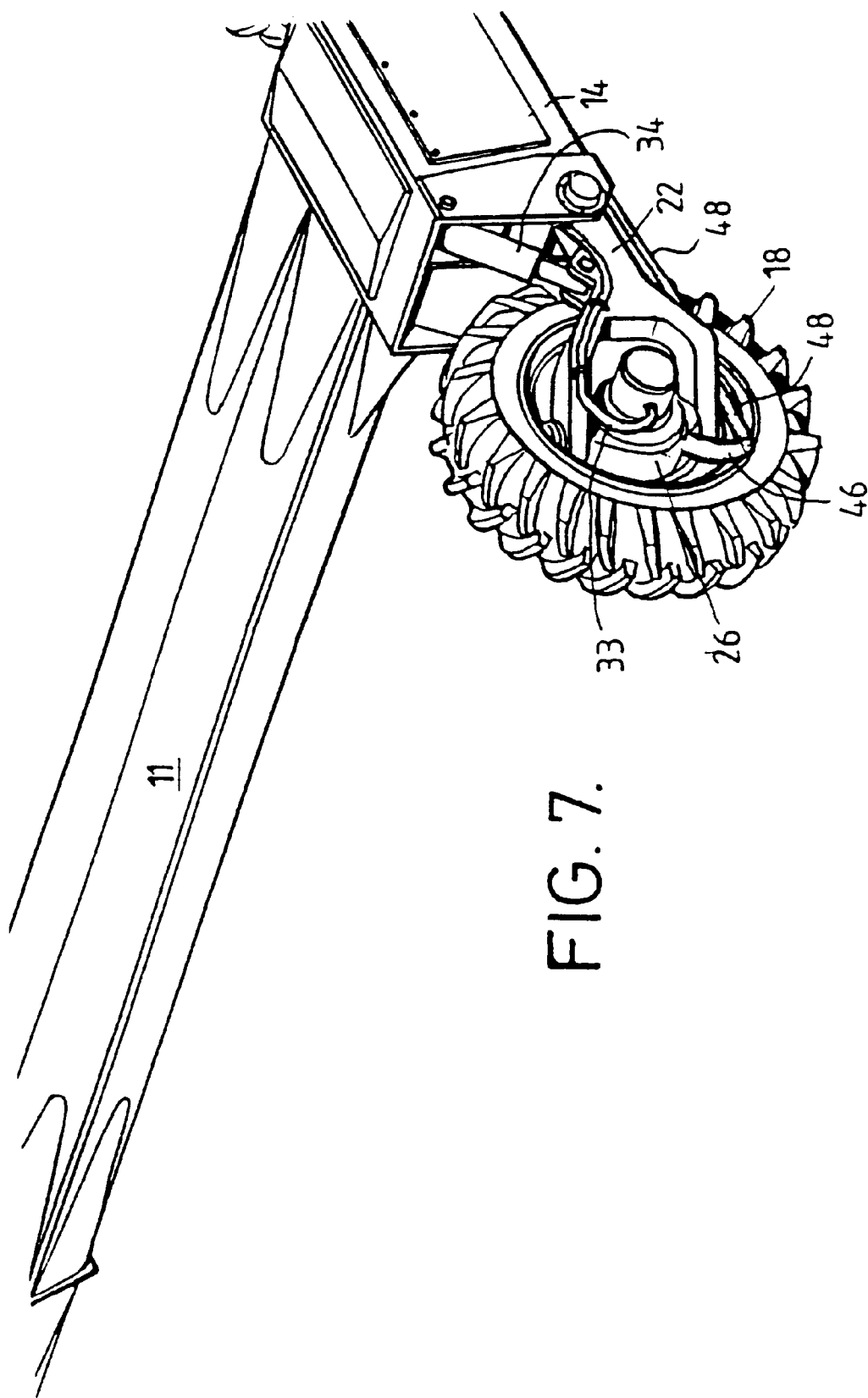
FIG. 7 is a detail fragmentary perspective view of one wheel showing the exposed part of the steering system.
Figure 8:
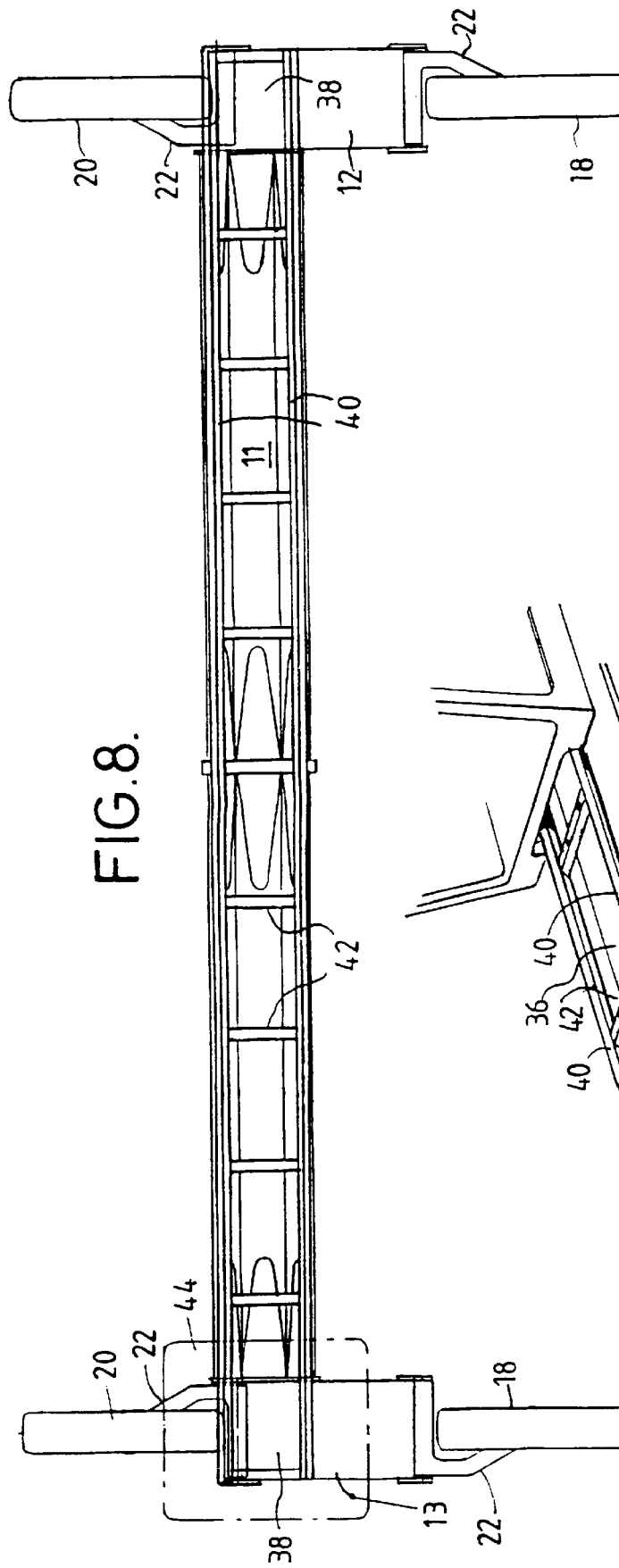
FIG. 8 is a plan view of the vehicle showing the top rails and with the cab in phantom.
Figure 10:
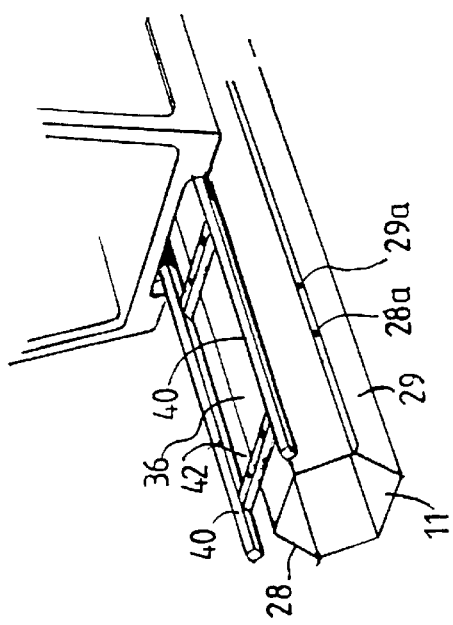
FIG. 10 is a detail cut-away view of the elongate section, rails and cab in perspective.
Figure 9:
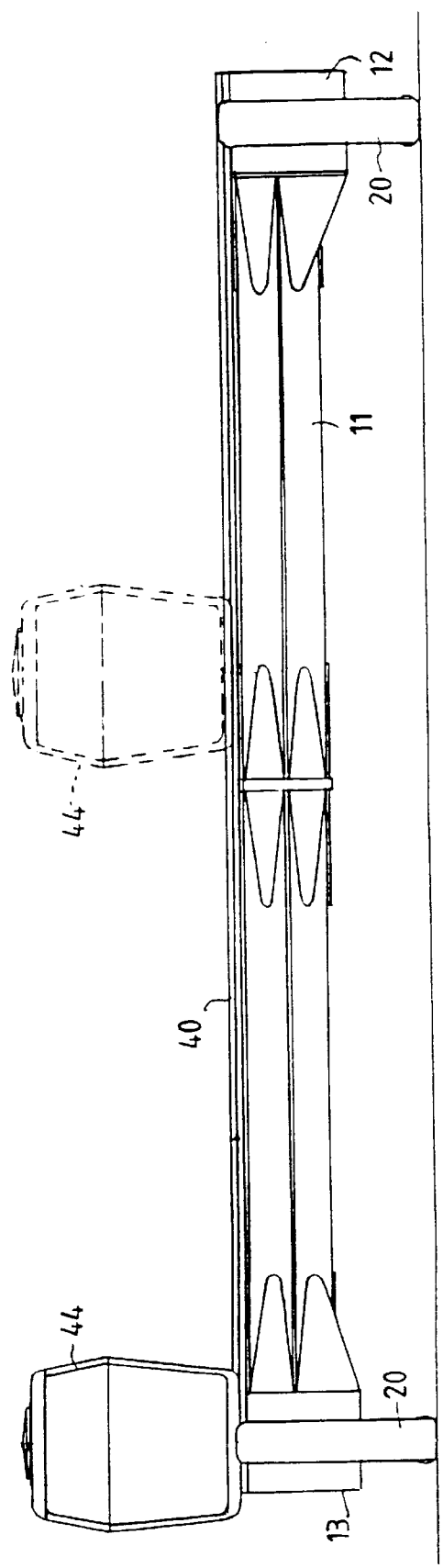
FIG. 9 is a front view of the vehicle showing the top rails and movement of the cab.

The tubular hoses 33 are omitted from the figures except for FIG. 7.

The arm 22 of the rear wheel 18 on each of the chassis sections 12,13 extends to the outer side of the wheel 18 while the arm 22 connecting to the front wheel 20 extends to the inner side of that wheel 20.

The arm 22 leading to the front wheel 20 is rigid with the chassis section 12 while the arm 22 leading to the rear wheel 18 is pivotally connected to the chassis section 12 at the lower rear corner of the rectangular casing 14 and the angle of the arm is controlled by a ram 34 which acts between an upper part of the chassis section 12 and a portion of the arm 22 just before the arm 22 is divided to form the branches 24. This enables the working height of the elongate section to be set as desired.

The elongate section 11 is connected to each chassis section casing 14 adjacent the front edge of the chassis section casing 14 so that the elongate section 11 is offset towards the front of the vehicle 10. The upper surface 36 of the elongate section 11 is substantially co-planar with the upper surface 38 of the casings 14 of the chassis sections 12,13. Rails 40 connected by cross members 42 are provided on the upper surfaces 36,38 to extend over the entire width of the vehicle 10. The rails 40 are more widely spaced apart than the width of the upper surface 36 of the elongate section 11. The rails 40 are square in cross-section and arranged with one edge facing upwards. A cab 44 is mounted on the rails 40 and is provided with an indexing motor (not shown) so that it can be indexed from one end of the rails 40 to the other so that the driver can be seated over either chassis section 12,13, or anywhere on the elongate section 11, as desired. The cab 44 may be rotatable on the rails 40 or alternatively the cab may be in a fixed rotational position and the controls optionally together with the seat may be movable within the cab 44. A camera (not shown) may be provided at each end of the vehicle with a screen or other viewing means being provided in the cab to be viewed by the driver.

A limb 46 extends from the hub 26 of the wheel 18 in the opposite direction from the arms 22. The end of the limb 46 is pivotally connected to a push rod 48 which is pivotally connected to the end of a lever 50 which is in turn pivotally mounted on the chassis section 12 on the longitudinal centre line thereof. The outer end of the lever 50 is connected to one end of a ram 52 the other end of which is connected to a centrally pivotable element 54 which is also centrally pivoted on the longitudinal axis of the chassis element 12. The other end of the centrally pivotable element 54 is connected to a ram 52, lever 50, push-rod 58 and limb 46 in corresponding arrangement for the front wheel 20. A single hydraulic motor (not shown) powered by the engine 16 is arranged to pivot the centrally pivotable element 54 to steer the wheels of the vehicle under control from the vehicle driver. The limb 46 and push rod 48 are only shown in FIGS. 5, 6 and 7 of the figures and elsewhere have been omitted for clarity.

In use, with the wheels as shown in FIG. 1, the vehicle 10 can be driven transversely to the elongate section 11 and this position of the wheels represents one pivotal extent of their movement. Pivoting of the centrally pivotable element 54 will pivot the limbs 46 towards the chassis sections 12,13 to pivot the wheels 18,20 in parallel to a further desired position. It is seen that the wheels 18,20 can be aligned so as to drive the vehicle 10 longitudinally of the elongate section 11 and indeed the wheels 18,20 can be pivoted still further until they nearly touch the opposite side of the arms 22. This provides an additional 40° of pivoting from the position for longitudinal drive. In this way, this long vehicle 10 can be driven on the road and steered around corners. Clearly this range of pivoting of the wheels is exceptional, but is required to permit the necessary angle of movement for the vehicle to be driven longitudinally on roads. The fact that the yoke arm 22 is connected to the hub 26 of the wheel just above and below the rotational axis provides a very strong durable engineering construction which is well able to cope with the forces exerted upon it is use on the road or in a field. The rams 52 enable the wheels to be arranged in a non-parallel fashion. For example, if the front wheel 20 of each of the chassis sections 12,13 is arranged at a slight angle to the position for transverse driving of the vehicle 10, then the vehicle can be rotated about the centre of the elongate section 11.

Figure 11:
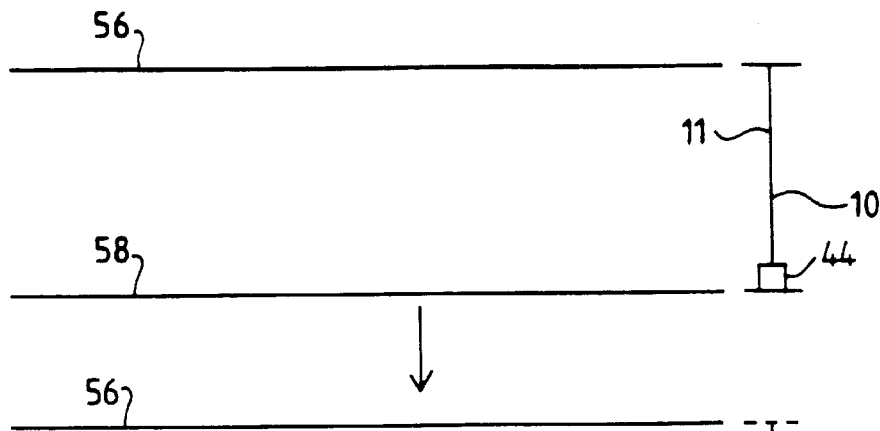
FIGS. 11,12 and 13 show the vehicle in stages of movement over a field.
Figure 12:
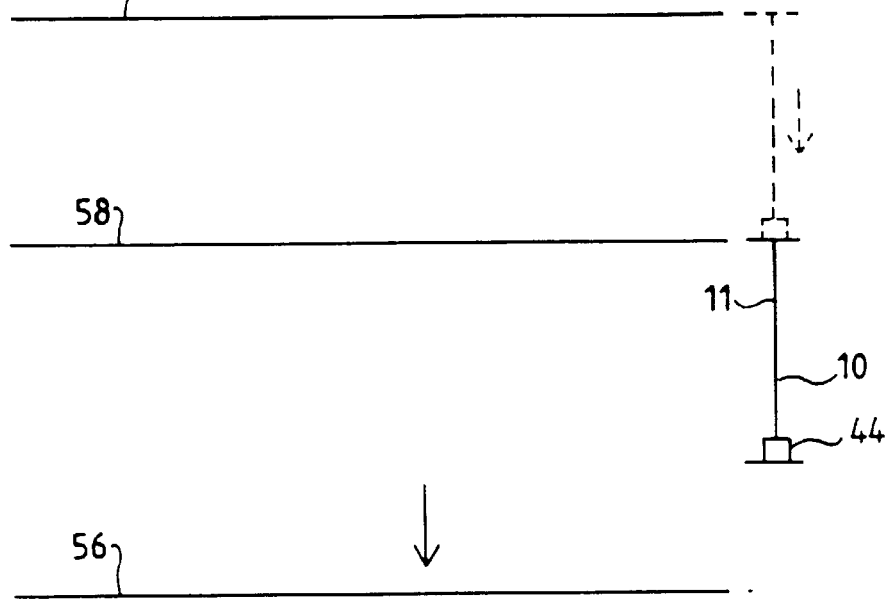
Figure 13:
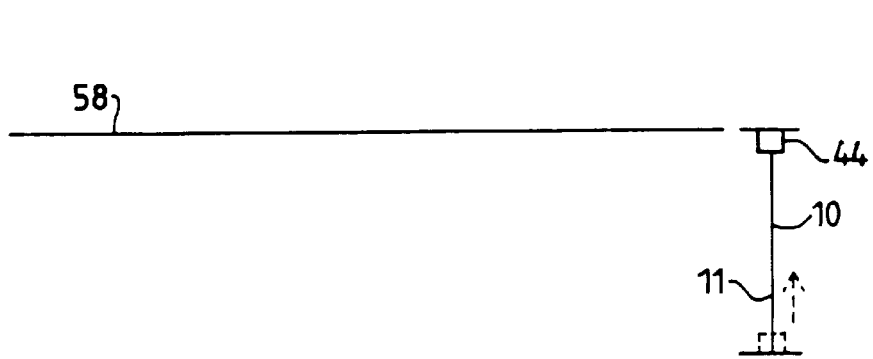

FIGS. 11,12 and 13 show the sequence of events in making passes along a field. The vehicle is first driven across the field transversely which leaves two wheel tracks 56,58. In order to make the next pass across the field, the wheels 18,20 are rotated so that the vehicle 10 can be driven longitudinally. The driver then drives the vehicle 10 with the cab 44 at the front so that the rear wheels are substantially aligned with one of the wheel tracks 58. The cab 44 is then indexed along the rails 40 the opposite end of the vehicle and the wheels of the rear chassis section 13 are aligned with the wheel track 58. The wheels are then turned so that the vehicle 10 can be driven transversely and the driver with the cab 44 positioned over the chassis section 13 is well positioned to ensure that the wheels 18,20 follow the previous wheel track 58 accurately. In this way, less compaction of the soil takes place so that a greater area of the field can be productive.

Figure 14:
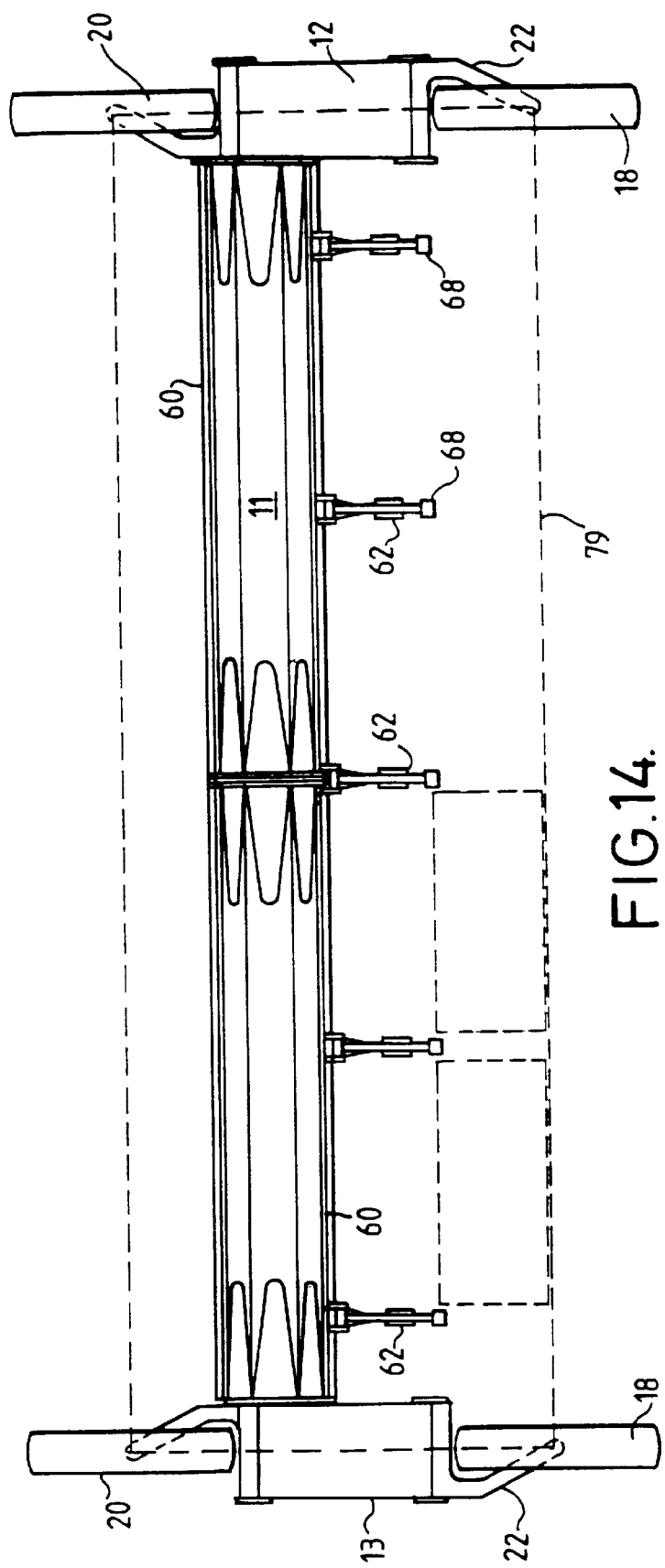
FIG. 14 is a plan view showing linkages on the elongate section.

As well as rails 40 on top of the elongate section 11, there are also rails 60 provided on the lower surface of the elongate section 11 although these do not extend across the chassis sections 12,13 like the rails 40. The rails 60 mount linkages 62. Each linkage 62 is clamped about the rail 60 and includes a pivotally mounted arm 64 and a pivotally mounted ram 66 for the arm 64 to control the angle of the arm 64. Five linkages 62 are provided equi-spaced along the elongate section 11. Each arm 64 includes a connector 68 at its end to connect to the sides of two adjacent rectangular frames 69 (shown in phantom in FIG. 14) carrying tools to be drawn across the ground. Alternatively, the arm connectors 68 may be connected to the joint positions in a jointed frame. To cater for different widths of frame, the linkages 62 can be unclamped from the rail 60 and slid along the rail 60 to any appropriate position to be reclamped.

A height sensor (not shown) of known type is employed. The height sensor may for example be a mechanical arm which runs over the ground or may involve the sensing of emitted electromagnetic radiation. The angle of the arms 64 is adjusted in correspondence with the height sensed by the height sensor or each height sensor where a plurality of height sensors are provided across the length of the elongate section 11.

Where the linkages 62 are provided on the rail 60 to the rear side of the elongate section 11, the frames 69 may be such as to lie within the notional rectangle 71 in plan defined between the pivot axes of the four wheels 18,20. This improves the weight distribution of the vehicle 10 and is enabled by the offset of the elongate section 11 towards the front of the vehicle.

Nevertheless, if desired, the linkages can be connected to the front rail 60 of the elongate section 11 and the linkages are reversible so that they can be used on either of the rails 60.

Figure 17:
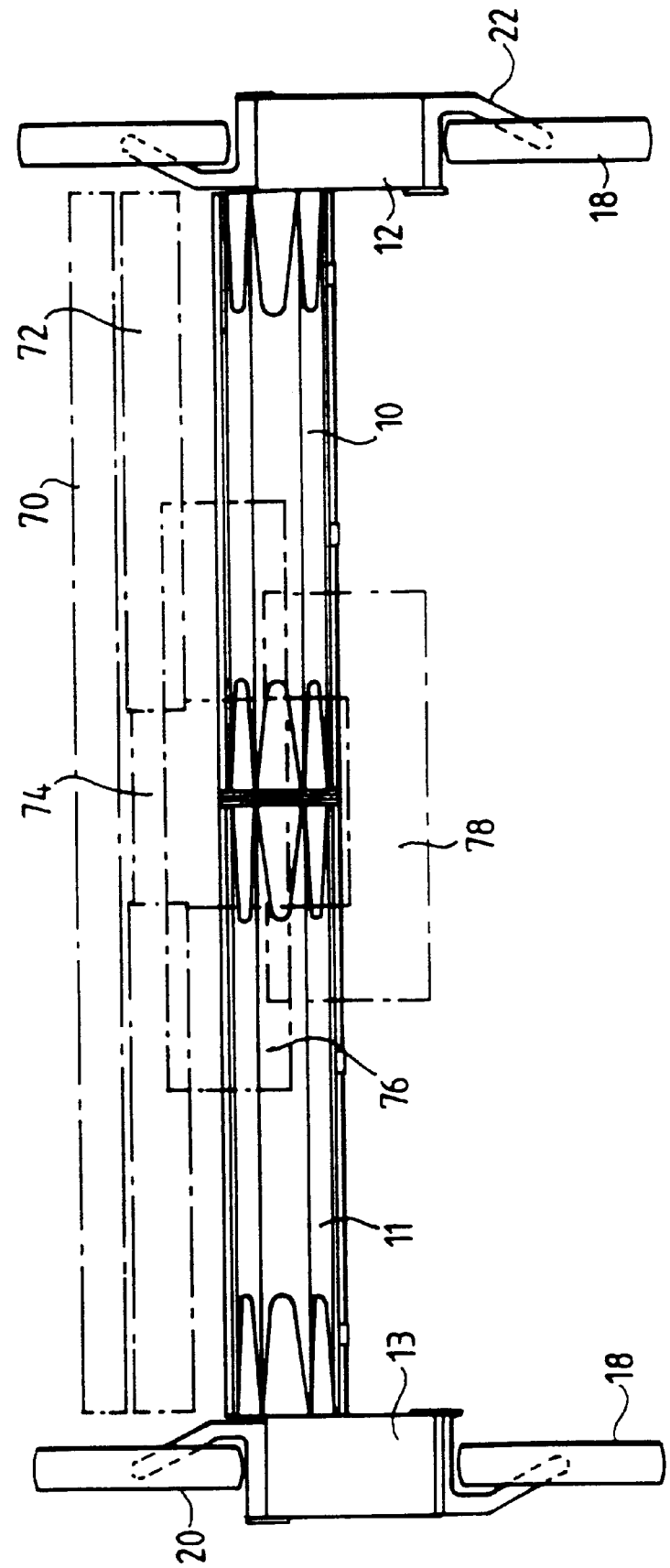
FIG. 17 is a plan view of the vehicle fitted with harvesting equipment.

FIG. 17 shows the vehicle 10 fitted with equipment for harvesting corn. A stripper bar 70 is connected to the lower front rail 60 and extends over the length of the elongate section 11. Two conveyors 72 are arranged immediately behind the stripper bar 10 and are arranged to convey ears of corn stripped from the stalk to a central conveyor in the form of a movable sieve 74. Loose grains of corn will fall through the movable sieve 74 into a container 76 provided therebelow. The remaining ears of corn are deposited into a large central hopped 78 which is carried to the rear of the elongate section 11.

Having passed over a field of crop with the harvesting equipment on the vehicle 10, the standing stalks are then left to dry. Drying is effected relatively rapidly as the stripper bar 70 not only strips off the full ear of corn but also strips off the upper flag leaf of the stalk and at least some of the sheath formed by the other leaves of the stalk. In order to harvest the standing stalks, the stripper bar 70, container 76 and hopper 78 are removed. In their place, a straw cutter bar 80 is mounted on the front lower rail to lie in front of the conveyors 72 and a straw chopper 81 is provided behind the movable sieve 74 and feeds balers 82 mounted to either side of the straw chopper 81 on the elongate section 11. The balers 82 incorporate wrapping apparatus.

In use, the cutter bar 80 cuts the standing straw near ground level and the straw is then conveyed by the conveyors 72 to the movable sieve 74, which is covered to act as a continuous conveyor, so that the straw is deposited in the chopper 81. After being chopped, the straw is conveyed to the two balers 82 which form suitably shaped bales, wrap the bales and deposit them on the ground for subsequent collection.

Thus, all of the matter which is cut when the heads of corn are cut is carried away by the vehicle 10 either in the container 76 or in the hopper 78. Again, when the vehicle 10 is provided with straw chopping equipment, all of the cut matter is baled and wrapped. In this way, weeds and weed seeds are not re-deposited onto the ground or spread into the air and the weed problem is greatly reduced in comparison with the known combine harvester.

Although harvesting is carried out in two operations, the vehicle may be sufficiently wide that a similar number of passes will need to be made than for the narrower combine harvester and so that time taken and fuel used may be similar or reduced in comparison with the known combine harvester.

Figure 19:
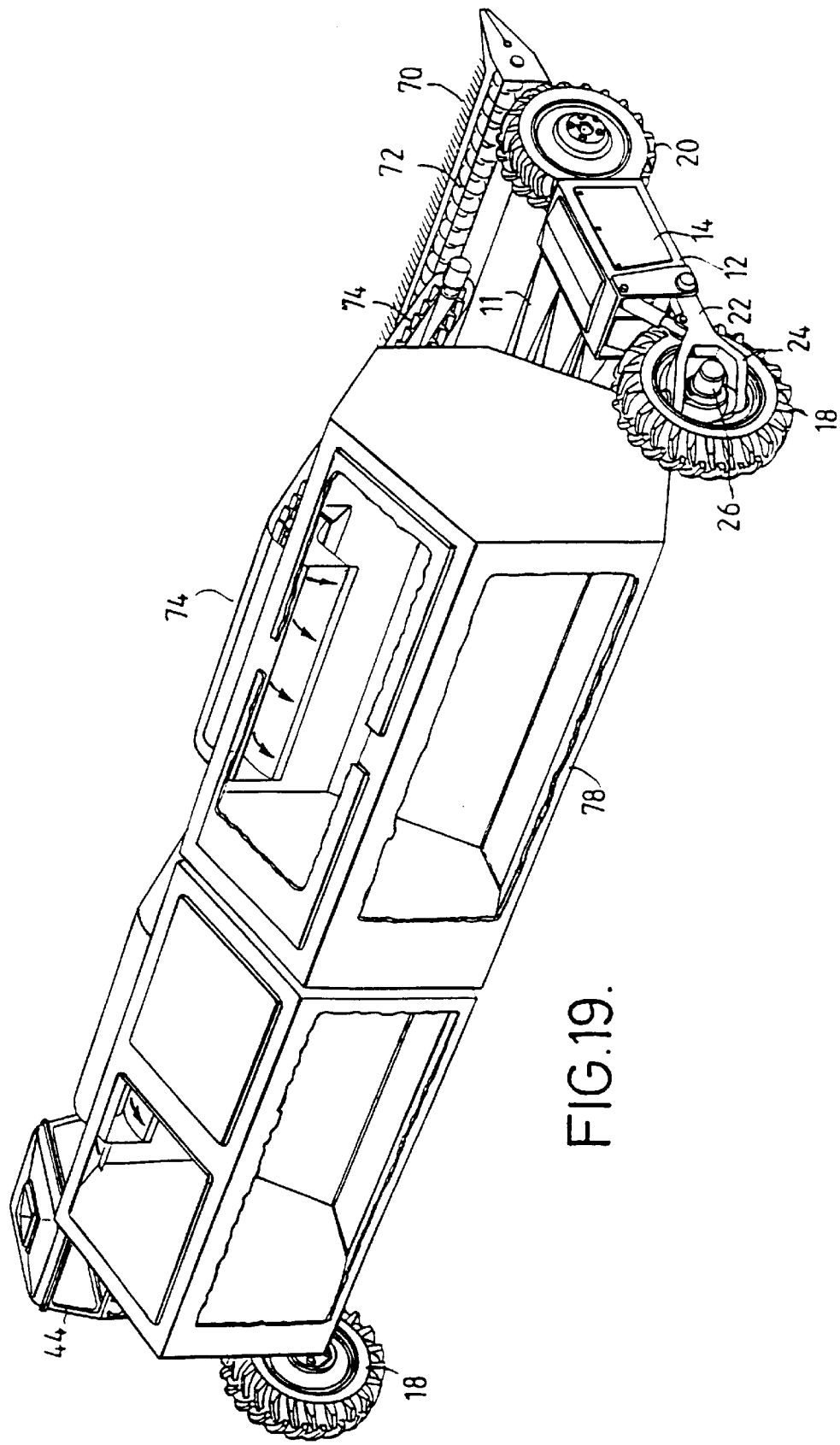
FIG. 19 is a perspective view showing the vehicle fitted with alternative corn harvesting equipment.

FIG. 19 shows a further embodiment of the harvesting equipment on the vehicle 10, but in this case two large hoppers 78 are provided and the movable sieve 74 is replaced by two normal conveyors so that all of the cut material is deposited into the two large hoppers 78.

Figure 18:
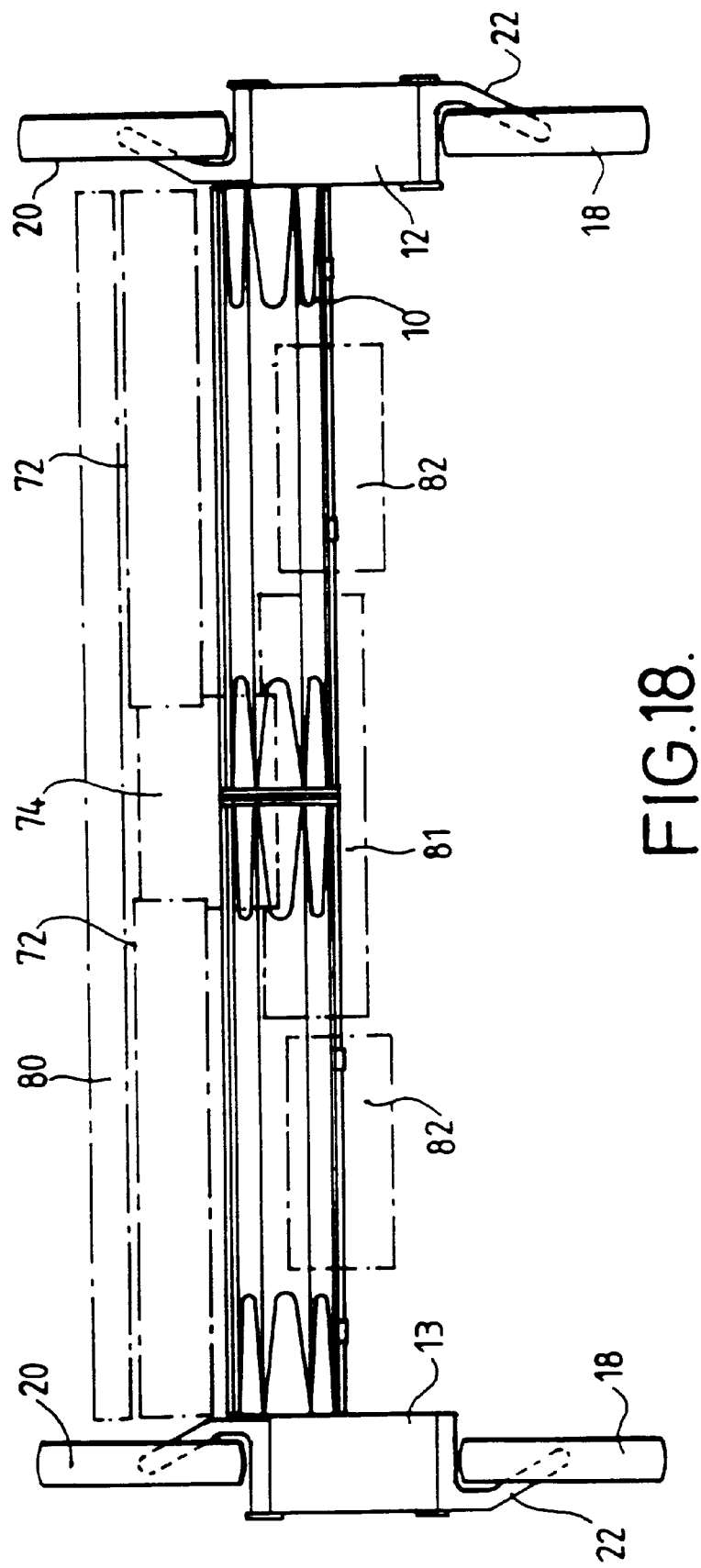
FIG. 18 is a plan view of the vehicle fitted with straw cutting equipment.

In this embodiment and in the embodiment of FIGS. 17 and 18 it is seen that the majority of the weight carried by the vehicle 10 which is constituted by the cut matter in the hopper or hoppers 78 is carried within the overall dimensions of the basic vehicle and clearly has its centre of gravity within the notional plane rectangle defined by the pivot axes of the four wheels 18,20 so that the weight distribution of the vehicle 10 is very good.

Figure 20:
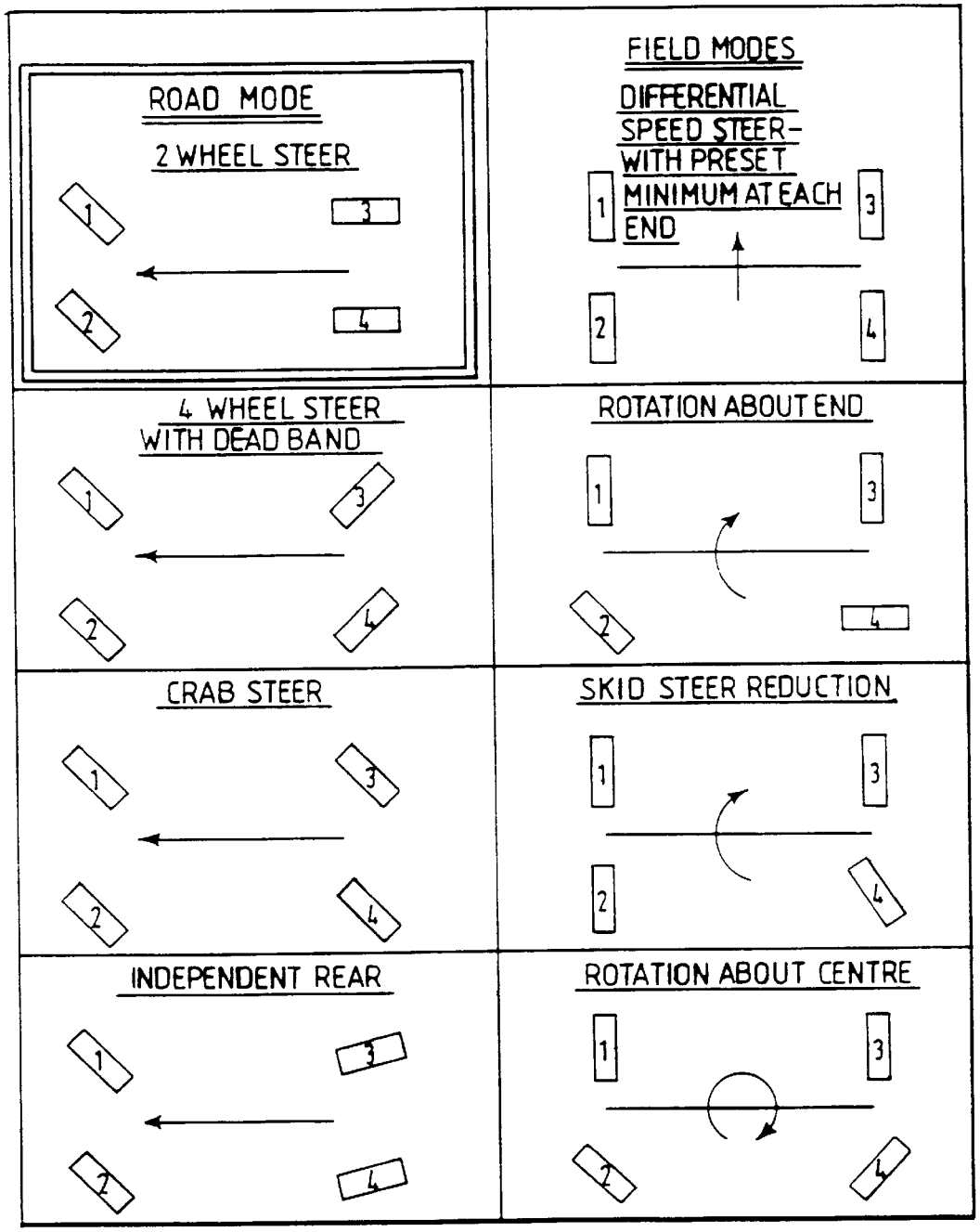
FIG. 20 is a schematic diagram of the modes of steering of the vehicle.

FIG. 20 shows the different ways in which the vehicle can be steered. Each manner of steering will be described in the order of the two columns shown.

In the two wheel steering mode, the vehicle is driven longitudinally of the elongate section 11 and the rear wheels are held parallel to the elongate section 11. The front wheels are turned in parallel with one another to steer the vehicle. Thus, the rams 52 are not used and are locked in the retracted position. This mode is intended to be used for driving on roads while each of the other modes is intended to be used to steer and orientate the vehicle in a field.

In the four wheel steer mode, the rams 52 again are not used, and the front wheels steer in parallel as in the two wheel steer mode. In the four wheel steer mode however the rear wheels move with the front wheels but rotate in the opposite sense and through the same angle. Thus, tight or long curves can be described.

In the crab steer mode, the rams 52 again are not used and are locked in the retracted position. The front and rear wheels again move together through the same angle, but this time they move in the same sense. In this way the vehicle can be steered at any required diagonal angle to the elongate section 11.

In the independent rear mode, the rams 52 again are not used and are locked in the retracted position. However, the front wheels are steered independently of the rear wheels to give extra flexibility and control of the vehicle.

Each of the modes described so far is intended to be used when driving the vehicle longitudinally of the elongate section.

With the wheels arranged perpendicular to the elongate section 11, the vehicle can be driven transversely to the elongate section 11. In this case, the vehicle is steered by introducing a speed differential between the wheels 18,20 of one chassis section in relation to the wheels 18,20 of the other chassis section 11.

The vehicle can be rotated about one end ie. about one chassis section 11. In this case, the wheels to one side of the elongate section 11 are aligned perpendicular to the elongate section 11. The other wheel at the end about which the rotation will take place is arranged parallel to the elongate section 11 while the last wheel is arranged at an angle to the elongate section 11.

In the differential speed steering mode, there is likely to be a significant amount of skid of the wheel if turns of more than small angle are attempted. In the skid steer reduction mode, the rear wheel of the vehicle which is on the inside of the turn is angled to reduce skidding.

The vehicle can be rotated about its center by angling of the rear wheels.

In each of the last three modes described, the differential angles between wheels on the same chassis section 11 will be achieved by the use of the rams 52.

It is envisaged that the vehicle will be controlled by a joy stick controller and a mode selection key pad. The mode selection key pad will have keys to select each of the modes described above while the joy stick will control steering and speed.

Figure 21:
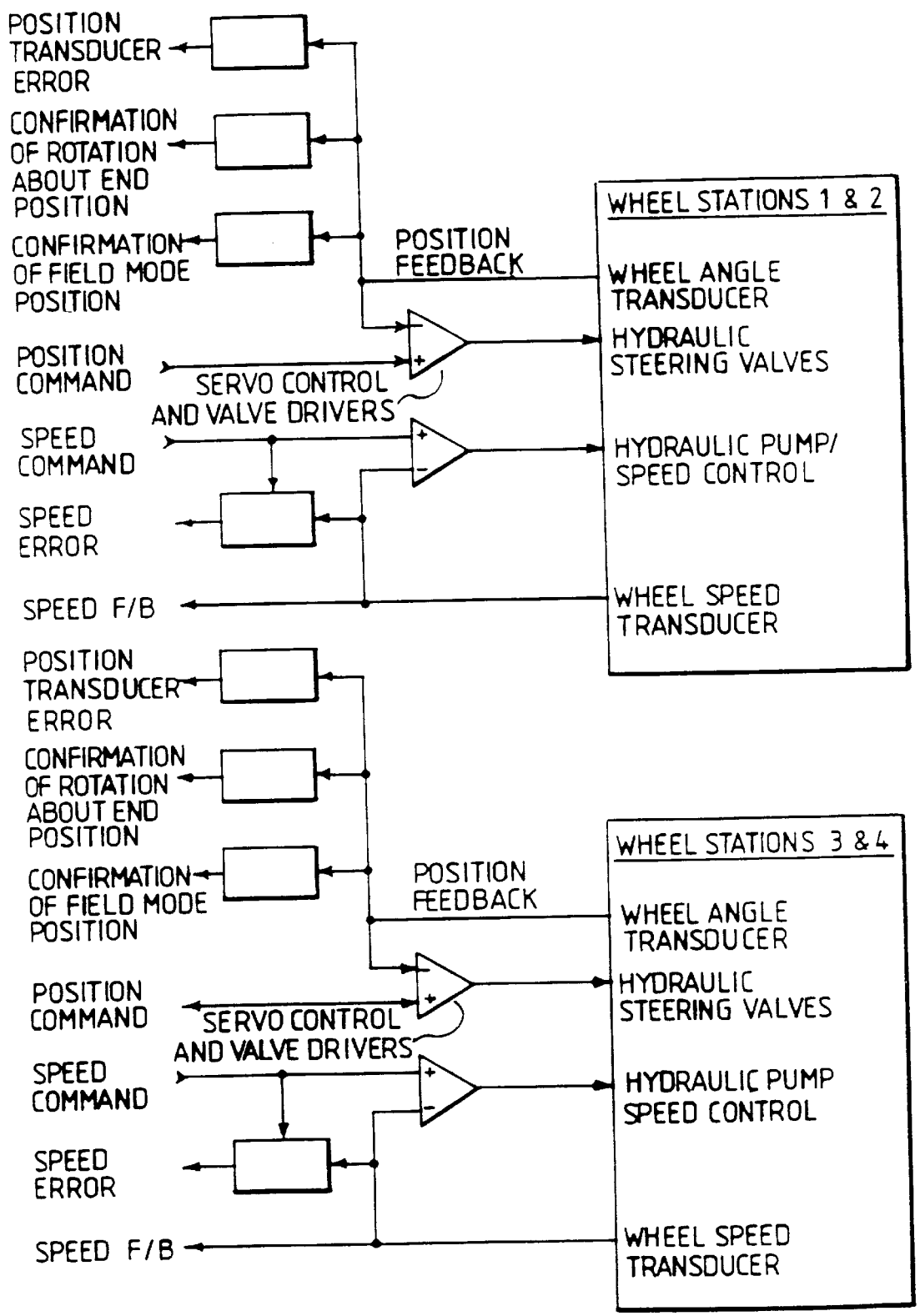
FIG. 21 is a diagram of the control circuitry.

Potentiometer sensors are mounted in all wheels at as a pivot point of each wheel. These are energised by a stabilised voltage from a power supply and provide analogue voltage feedback representing the angle of each wheel. Feedback control is thus used by comparison of command and feedback voltages to control the hydraulic valves of the hydraulic motors 26 on rams 52 or the hydraulic device controlling the centrally pivotable element 54. The feedback control may be through electronic circuitry or the entire system may be under computer control. The electronic circuitry control system is shown schematically in FIG. 21 with input from the mode key pad and joy stick to the left of the figure.

In a further embodiment, the arm 22 of the rear wheel 18 of each of the chassis sections 12,13 extends to the inside rather than the outside of the wheel 18, while the arm connecting to the from wheel 20 extends to the outer side of the wheel 20. This arrangement is in fact preferred because of the offset of the elongate section 11, and as it provides better turning clearance.

We claim:

1. A vehicle comprising a structure including an elongate section and further sections mounted to respective ends of the elongate section in fixed relation thereto, each further section having wheels and drive means for driving the wheels, the vehicle being configurable in a road orientation in which the vehicle is driven in a direction generally parallel with the longitudinal axis of the elongate section and an operating orientation in which the vehicle is driven generally transverse to the longitudinal axis of the elongate section, each further section having two spaced apart driving steerable wheels, each steerable wheel being pivotable relative to the respective further section between the road orientation and the operating orientation so as to effect the configuration of the vehicle, the wheels being arranged such that the wheels on each further section lie spaced apart and generally in line with each other in the operating orientation and in the road orientation the wheels on each side of the vehicle lie generally in line with each other and the drive means comprising two engines, one engine in each further section.

2. A vehicle as claimed in claim 1, wherein each engine drives the or each driving wheel of the further section by which it is carried by a hydraulic motor.

3. A vehicle as claimed in claim 2, wherein a hydraulic motor is provided for each driving wheel.

4. A vehicle as claimed in claim 1, wherein a plurality of driving wheels is carried by each further section.

5. A vehicle as claimed in claim 1, wherein the elongate section is transversely offset in relation to the further sections.

6. A vehicle as claimed in claim 5, wherein, the elongate section is offset by a distance such that equipment to be carried or pulled by the vehicle does not extend transversely past the transverse extent of the further sections.

7. A vehicle as claimed in claim 5 wherein each further section carries a plurality of transversely spaced wheels.

8. A vehicle as claimed in claim 7, wherein the elongate section is offset by a distance such that equipment to be carried or pulled by the vehicle lies within the notional plan rectangle defined by the pivot axes of the outermost wheels of the further sections.

9. A vehicle as claimed in claim 8, wherein the outermost wheels of the further sections are drive wheels.

* * * * *